No. 707,151. Patented Aug. 19, 1902.
M. H. MOSS.
ADJUSTABLE MIRROR.
(Application filed Feb. 27, 1902.)
(No Model.)
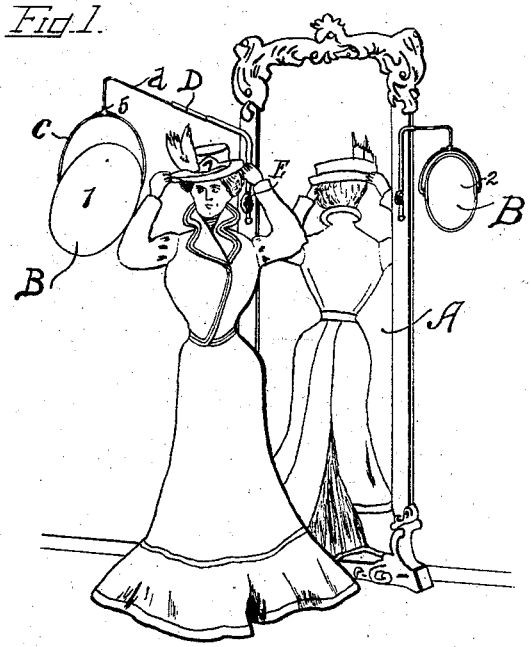
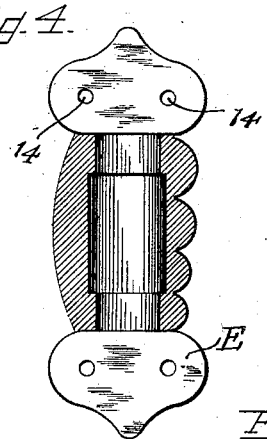
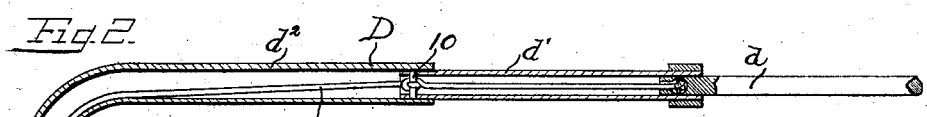
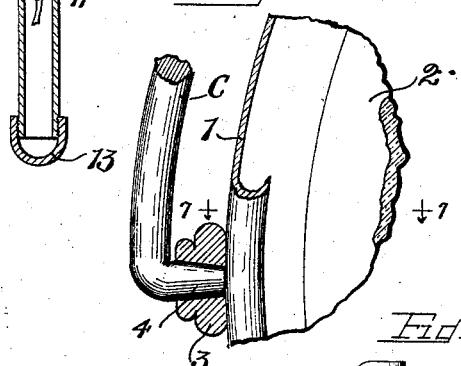
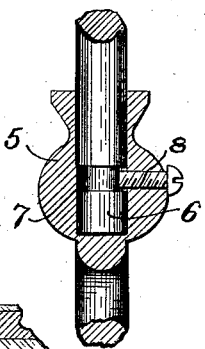
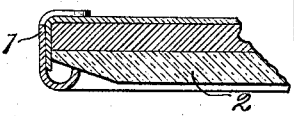
Witnesses
Herbert F. Obergfell
Harvey L. Hanson.
Inventor
Myer H. Moss
By Charles A. Brown, Cragg & Lefield
Attorneys
THE NORRIS PETERS CO., PHOTO-LITHO., WASHINGTON, D. C.

UNITED STATES PATENT OFFICE.

MYER H. MOSS, OF CHICAGO, ILLINOIS.

ADJUSTABLE MIRROR.

SPECIFICATION forming part of Letters Patent No. 707,151, dated August 19, 1902.

Application filed February 27, 1902. Serial No. 95,865. (No model.)

*To all whom it may concern:*

Be it known that I, MYER H. MOSS, a citizen of the United States, residing at Chicago, in the county of Cook and State of Illinois, have invented a certain new and useful Improvement in Adjustable Mirrors, (Case No. 1,) of which the following is a full, clear, concise, and exact description, reference being had to the accompanying drawings, forming a part of this specification.

My invention relates to an adjustable mirror, or, in other words, a mirror and a supporting device by which the mirror can be adjusted angularly and in both horizontal and vertical directions.

Prominent objects of the invention are to provide a simple and practical construction of mirror-support for permitting such universal adjustment of the mirror and to make the same as handsome and attractive as possible and permit it to be made at low expense.

In the arrangement herein shown for carrying out my invention I provide a mirror which can be of any suitable shape or style and support the same by a frictional pivotal engagement at its sides, whereby it can be adjusted to any desired angle. This pivotal support is arranged at the outer end of a telescoping arm and has a swivel or pivotal connection therewith by which the mirror can be adjusted about a vertical axis. A horizontal adjustment of the mirror is permitted by the telescoping arm by an adjustment of its telescoping sections, as usual in such devices. This telescoping arm is sustained by a support adapted to permit a vertical adjustment of the arm, whereby the vertical adjustment of the mirror is obtained.

In the accompanying drawings, Figure 1 is a view of a large mirror and two adjustable mirrors embodying my invention, one of which is being used by a lady. Fig. 2 is a longitudinal section of the major portion of the adjustable telescoping arm. Fig. 3 is a view showing the frictional pivotal connection for the mirror. Fig. 4 is a view of the adjustable bracket for supporting the telescoping arm. Fig. 5 is a view of the pivotal connection between the end of the arm and the mirror-support. Fig. 6 is a view of the detachable end of the adjustable arm. Fig. 7 is a cross-section on line 7 7 in Fig. 3.

In Fig. 1 I have shown two adjustable mirrors embodying my invention arranged on opposite sides of a large wall-mirror A. The adjustable mirrors of my invention comprise small mirrors B, which may be of any suitable shape or form, the one most desired by me being elliptical, as shown in the drawings. These elliptical mirrors are desirably made with a metal back and frame, 1 containing a reflecting-glass 2. The metal frame 1 is provided with sockets 3, one on each side of the frame a little above the middle thereof. These sockets contain the bent ends 4 of an elliptical yoke C, which is so constructed as to tend to force the bent ends 4 inwardly toward one another, whereby friction is maintained between these ends and the sockets 3 3. This friction provides a frictional pivotal joint, which holds the mirror in any position to which it may be adjusted with reference to the yoke C. The upper and middle portion of this yoke is provided with a socket 5, which receives the end 6 of the outer section $d$ of a telescoping arm D. The end 6 is provided with an annular groove 7 and the socket 5 with a screw 8, adapted to fit into said annular groove, whereby a pivotal connection is formed between the end 6 and the socket 5, by which arrangement the yoke C, and thereby the mirror B, can be swung or adjusted about a vertical axis. The section $d$ of the arm D has its outer end bent downwardly, as shown in Fig. 1.

The arm D is conveniently constructed of two flat sections $d'$ and $d^2$ in addition to the section $d$. The sections $d'$ and $d^2$ are made hollow, as shown in Fig. 2. The inner end of the section $d$ fits into the outer end of the section $d'$, and the inner end of the latter fits in the outer end of the section $d^2$. The section $d^2$ has its inner end bent downwardly, as shown in Figs. 1 and 2. To prevent a withdrawal of the sections $d$ and $d'$ to an extent to separate them from one another and from the section $d^2$, a flexible connector 9 is arranged within the sections $d'$ and $d^2$ and has its outer end connected with the inner end of the outer section $d$ and its middle portion connected with the inner end of the section $d'$, as by a pin 10, and its inner end connected with the section $d^2$, as by a button 11, arranged to strike against a pin or stop 12. The lower end of the section $d^2$ is threaded and provided with a closure or fitting 13, which may be of any suitable shape. The vertical portion of the section $d^2$ is arranged within a bracket E, provided with apertures 14 14, by which it can be screwed to the wall or any other support. This bracket E has its bore made slightly larger than the outer surface of the portion of the section $d^2$ which fits therein, whereby a sliding movement of such portion of the section $d^2$ is permitted, and a locking effect is secured by the strain imposed upon such portion by the weight of the mirror. The bracket E may have any desired form or configuration, a desirable arrangement being to make it in the form of a closed hand, as shown in Fig. 1.

To place the mirror in position for use, the cap 13 is unscrewed, the bracket E is secured to the wall or other support, and the vertical portion of the section $d^2$ is passed through the bore of the bracket, after which the cap 13 is again screwed into place.

To adjust the mirror, a vertical adjustment is secured by adjusting the telescoping arm D in the bracket E. To secure a horizontal adjustment, the telescoping arm D is elongated or shortened, as required. For vertical angular adjustment the yoke C is adjusted relatively to the end of the arm D. To secure a horizontal angular adjustment, the mirror itself is adjusted relatively to the yoke C. In this way a universal adjustment of the mirror can be secured in an easy and rapid manner.

It will be understood that the arrangement herein shown and described is illustrated for the purpose of showing my invention and that I do not intend to limit myself to such arrangement or construction.

What I claim as my invention is—

In a device of the class described, the combination with a mirror having its sides provided with sockets, of a yoke adapted to embrace the mirror, having its end portions bent in and adapted to fit in the sockets on the mirror and having frictional engagement with the said sockets, an arm bent to project horizontally and having a vertical portion that is rotatably mounted, the horizontal portion of the arm being formed in telescoping sections $d$, $d'$, $d^2$, the front section $d$ having pivotal connection with the yoke while the remaining telescoping sections are tubular, a flexible connector 9 passing through the hollow sections of the arm and engaging the front section $d$, the rear end of the said flexible connector having attached thereto a button 11 and a stop 12 located in the section $d^2$ above the button, whereby the extent to which the sections may be separated is limited, substantially as described.

In witness whereof I hereunto subscribe my name this 17th day of February, A. D. 1902.

MYER H. MOSS.

Witnesses:
A. MILLER BELFIELD,
HARVEY L. HANSON.